United States Patent [19]

Taylor et al.

[11] 4,446,886

[45] May 8, 1984

[54] SAFETY RELIEF VALVE SOFT SEAT

[76] Inventors: Wesley L. Taylor; Julian S. Taylor, both of 8300 SW. 8, Oklahoma City, Okla. 73108

[21] Appl. No.: 355,981

[22] Filed: Mar. 8, 1982

[51] Int. Cl.³ .............................................. F16K 15/00
[52] U.S. Cl. ................................ 137/516.29; 137/469; 137/539.5; 251/362
[58] Field of Search ............... 137/469, 516.29, 539.5; 251/362

[56] References Cited

U.S. PATENT DOCUMENTS

| 2,588,157 | 3/1952 | Olson | 137/516.29 |
|---|---|---|---|
| 2,676,782 | 4/1954 | Bostock | 137/469 X |
| 2,860,662 | 11/1958 | Grey | 137/469 |
| 2,875,978 | 3/1959 | Kwiecik | 137/469 X |
| 2,878,896 | 3/1959 | Farrell | 137/516.29 X |
| 3,189,040 | 6/1965 | Johnson | 137/469 |
| 3,741,523 | 6/1973 | Scanamucci | 251/362 X |
| 3,754,568 | 8/1973 | Gallaghen | 137/516.29 X |

Primary Examiner—Harold W. Weakley
Attorney, Agent, or Firm—Robert K. Rhea

[57] ABSTRACT

In a poppet-type relief valve, including a housing having a spring guide assembly axially biasing a valve toward a seat in its inlet passageway, a soft valve seat member is coaxially disposed in the inlet passageway. The soft seat member includes a rigid surface limiting movement of the spring urged valve toward the inlet passageway and further includes a resilient ring seal positioned adjacent the rigid surface in a manner to be cushion contacted by and form a bubble tight seal with the spring urged valve before the valve contacts the suface.

8 Claims, 3 Drawing Figures

SAFETY RELIEF VALVE SOFT SEAT

BACKGROUND OF THE INVENTION

1. Field of the Invention

The present invention relates to pressure relief valves of the poppet or lift valve type and more particularly to an improved valve seat.

2. Description of the Prior Art

Pressure relief valves of the poppet or lift type generally comprise an elongated valve housing having an outlet port disposed at right angle to its inlet end. The inlet end is provided with a valve normally maintained seated on a seat intersecting the inlet passageway by a spring axially biasing the valve toward its seat in which excess pressure, above a predetermined limit, unseats the valve by compressing the spring.

One commonly used commercial design employs a precision ball valve disposed in a huddling chamber and seating on a finely ground metal seat. This type of relief valve enjoys the economy of manufacture of a precision ball valve member mated with a spherical lapped seat. While economical in manufacture these valves suffer from a relatively short service life due to a rapid deterioration of both the ball valve and the lapped seating surface as a result of mechanical impact while reseating.

This invention provides a greatly improved seating means through unique construction which provides all the economies of a spherical-shaped valve member with the bubble tight qualities of a resilient precision seat. Service life expectancies are on an order of magnitude greater than that of conventional metal ball valves and seats. The uniqueness of the design in part lies in the molding of an elastomer to a metal surface which then maintains the cylindrical precision of a seating lip. Further, the geometry of the seating lip is such that fluid pressure tends to move the resilient lip into bubble tight closure with the spherical valve member. Moreover the metal huddling chamber with limiting surface may be constructed of a material substantially softer than the ball valve member without adversely affecting service life thus permitting further economies in construction.

SUMMARY OF THE INVENTION

An elongated generally cylindrical valve housing, having a lateral exhaust port perpendicular to its axial inlet passageway, is provided with a spring urged plunger adjustably disposed axially in its other end portion bearing against a ball valve normally urged toward the housing inlet passageway. An improved seat member is disposed within the housing inlet passageway. The improved seat member is tubular in general configuration forming a huddling chamber at one end portion for the ball valve and defining a beveled annular inwardly converging ball valve stop surface intermediate its ends facing toward the ball valve for limiting movement of the ball valve toward the inlet passageway. The other end portion of the seat member coaxially receives a sleeve having a resilient ring seal bonded to its innermost end and impinged between the sleeve and adjacent surface of the seat member forming the annular converging surface. The downstream inner edge surface of the resilient ring seal forms a bubble tight seal with the ball valve when the latter is biased toward the inlet passageway in addition to cushioning movement of the ball valve toward the annular converging surface.

The principal object of this invention is to provide an improved soft seat for a pressure relief poppet valve which includes an annular resilient seal disposed adjacent a ball valve stop surface and forms a ring-like bubble tight seal with a ball valve which cushions the shock of the ball valve with its stop surface and materially increases the service life of the relief valve.

DESCRIPTION OF THE PREFERRED EMBODIMENT

Figure 1:
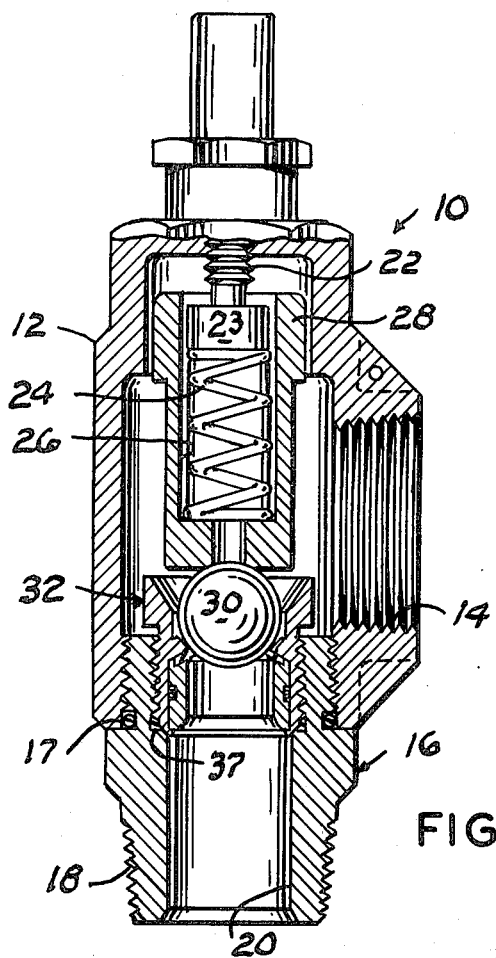
FIG. 1 is a vertical cross-sectional view, partially in elevation, of a pressure relief valve having the improved soft seat installed therein.
Figure 3:
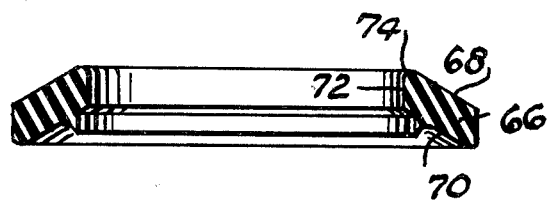
Figure 2:
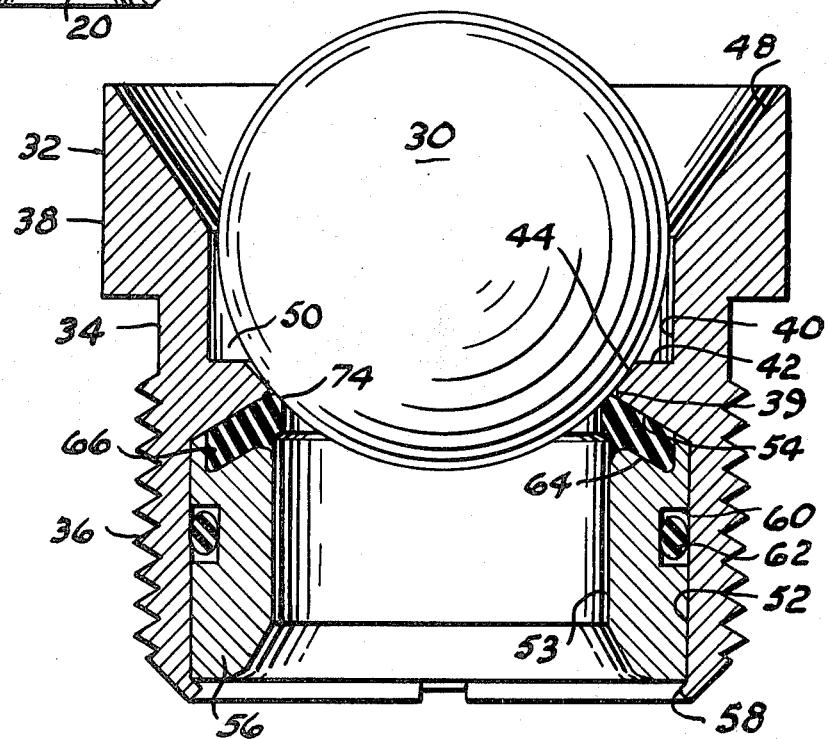
FIG. 2 is a vertical cross-sectional view, to a larger scale, of the relief valve soft seat and its associated ball valve; and, FIG. 3 is a diametric cross-sectional view of the resilient seal, per se.

Like characters of reference designate like parts in those figures of the drawings in which they occur.

In the drawings:

The reference numeral 10 indicates a relief valve comprising a hollow elongated generally cylindrical valve housing 12 having an internally threaded lateral exhaust port 14. The inlet end of the valve housing threadedly receives inlet means 16 sealed by an O-ring 17 and having external threads 18 for connection with a line or fitting, not shown, containing fluid under pressure and forming a fluid inlet passageway 20. The other end portion of the valve housing 12 threadedly receives axially an adjusting screw 22 for adjusting the release pressure rating of the valve. The inward end of the adjusting screw bears against a spring keeper 23 mounted on one end of a helical spring 24 nested by a socket 26 formed in a spring guide 28 normally biasing a ball valve 30 to an inlet passageway closed position by the resilience of the spring.

Soft seat means 32, secured to the inward end portion of the inlet means 16, forms a seat for the ball valve 30 for normally closing the inlet passageway 20. The soft seat means 32 comprises a generally cylindrical seat support member 34 having external threads 36 at one end portion threadedly received by the inward end portion of the inlet means 16 and sealed by an O-ring 37 and characterized by an enlarged head portion 38 at its other end. The seat member 34 is centrally bored, as at 39, on a selected diameter smaller than the diameter of the ball valve 30. The seat member 34 is counterbored from its head end, as at 40, for receiving the ball valve 30 and forming an annular shoulder 42 perpendicular to its longitudinal axis. A portion of the annular shoulder 42 is cut away to form an inclined annular surface 44 converging toward the inlet passageway 20 and facing toward the ball valve to form a stop limiting movement of the ball valve 30 toward the housing inlet end. The head end of the seat member 34 is further bored to form an inclined surface 48 converging toward the inlet passageway and intersecting the counterbore 40 at substantially the horizontal diametric position of the ball valve 30 when seated in the seat member, as presently explained, thus defining huddling chamber 50 for the ball valve. The other end portion of the seat member 34 is counterbored, as at 52, on a selected diameter which terminates in an inclined downstream converging surface 54 terminating adjacent but spaced upstream from the central bore 39.

The counterbore 52 closely receives a sleeve 56 having a bore 53 substantially equal with the seat member bore 39. The inward end of the sleeve 56 abuts the inwardly converging surface 54 and is staked in place at its outer end by bending portions of the seat member wall edge inwardly, as at 58. The periphery of the sleeve 56 is provided intermediate its ends with a circumferential groove 60 for receiving an O-ring 62, or the like, to form a fluid tight seal between the sleeve 56 and counterbore 52. Inwardly of its periphery, the inward end portion of the sleeve 56 is recessed, as at 64, on an angle parallel with the converging surface 54 for cooperatively receiving a resilient seal ring 66 which is secured to the sleeve 56 by bonding, not shown. The seal ring 66 is preferably formed from rubber-like plastic material presently marketed under the trade names Viton or Vespel. The toric cross section of the resilient ring substantially defines a rhomboid having opposing surfaces 68 and 70 contacting the seat support inclined surface 54 and sleeve recess forming surface 64, respectively. The inner wall surface 72 of the resilient ring is substantially parallel with the longitudinal axis of the seat support 34 and defines a diameter of slightly smaller dimension than the bore 39 and this surface 72 intersects the resilient ring seal surface 68 on a relatively small radii 74 facing downstream toward the ball valve adjacent the upstream limit of the ball valve stop surface 44. The resilient seal surface 74 is initially contacted by the ball valve 30 in a bubble tight seal before the ball valve contacts the surface 44. Fluid pressure in the inlet passageway 20, opposed by the spring force against the ball valve 30, acts on the inner peripheral edge portion of the resilient seal to enhance its seal with the ball valve.

When fluid pressure initially lifts the ball valve out of bubble tight contact with the seal ring surface 74 the escaping fluid is momentarily confined by the huddling chamber so that it is effective on the entire upstream hemispherical portion of the ball valve 30. Stated another way, fluid pressure against the part-spherical portion of the ball valve exposed to the fluid pressure within the inner periphery 72 of the seal ring initially lifts the valve at a predetermined pressure setting wherein the escaping fluid, restricted by the huddling chamber, is applied to a greater surface area of the ball valve.

Additionally, the inclined annular surface 44 may be lapped at its line point contact with the ball valve 30 for seating therewith thus in effect forming a second or supplemental valve seat for high temperature installations.

It seems obvious the valve 30 could be a configuration other than spherical if provided with a hemispherical or at least a part-spherical portion, not shown, facing the resilient seal 66.

Obviously the invention is susceptible to changes or alterations without defeating its practicability. Therefore, we do not wish to be confined to the preferred embodiment shown in the drawings and described herein.

We claim:

1. In a relief valve of the poppet-type including a housing having an inlet passageway communicating with an outlet port and having a spring assembly biasing a valve toward the inlet passageway, the improvement comprising:
    a seat support in the inlet passageway having a valve seat facing and seating the spring biased valve for closing the inlet passageway;
    a resilient seal ring disposed on the upstream side of said valve seat and projecting downstream in a manner to concentrically contact said spring biased valve prior to its contact with said valve seat; and,
    means including a sleeve bonded to and maintaining said resilient seal ring concentric with said valve seat.

2. The combination according to claim 1 in which said spring biased valve is a ball valve.

3. The combination according to claim 1 in which said resilient seal ring is substantially rhomboid-shape in toric cross-section and characterized by an annular transversely arcuate edge surface facing downstream to form a contiguous concentric line contact with said valve when said valve is seated.

4. The combination according to claim 1 or 3 in which the bore forming wall at the inward end portion of said sleeve is recessed for concentrically nesting circumferential surfaces of said resilient seal ring.

5. The combination according to claim 4 in which an end portion of said sleeve abuts said seat support upstream from said valve seat for preventing distortion of said resilient seal ring in response to fluid pressure against said sleeve.

6. The combination according to claim 4 in which the inner peripheral portion of said resilient seal projects inwardly of the cylindrical surface generated by the wall forming the bore of said sleeve,
    whereby fluid pressure biases the inner peripheral portion of said resilient seal ring toward said spring biased valve when the latter is in contact with the resilient seal ring.

7. A relief valve, comprising:
    a valve housing having an inlet passageway and an exhaust port;
    a valve within said housing, said valve having at least a part-spherical surface coaxially facing and being moveable longitudinally of the housing toward and away from the inlet passageway;
    seat support means in the inlet passageway forming a valve seat and a huddling chamber for said valve adjacent the valve seat and opposite the inlet passageway;
    resilient means for biasing said valve toward the valve seat and normally maintaining the major portion of said valve within the huddling chamber;
    a sleeve secured within the seat support means in the inlet passageway;
    an annular resilient seal concentrically bonded to and supported by said sleeve concentric with the valve seat and spaced upstream from the huddling chamber for contiguously line contacting and sealing with said valve at the upstream limit of its movement.

8. The relief valve according to claim 7 in which the resilient seal is characterized by a transversely arcuate annular edge surface facing toward and normally contacting said valve.

* * * * *